(12) United States Patent
Krishan et al.

(10) Patent No.: US 12,256,321 B2
(45) Date of Patent: Mar. 18, 2025

(54) METHODS, SYSTEMS, AND COMPUTER READABLE MEDIA FOR REPORTING A RESERVED LOAD TO NETWORK FUNCTIONS IN A COMMUNICATIONS NETWORK

(71) Applicant: Oracle International Corporation, Redwood Shores, CA (US)

(72) Inventors: Rajiv Krishan, Bangalore (IN); Sonal Jain, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 326 days.

(21) Appl. No.: 17/751,572

(22) Filed: May 23, 2022

(65) Prior Publication Data

US 2023/0379809 A1 Nov. 23, 2023

(51) Int. Cl.
*H04W 48/18* (2009.01)
*H04W 24/10* (2009.01)
(Continued)

(52) U.S. Cl.
CPC .......... *H04W 48/18* (2013.01); *H04W 24/10* (2013.01); *H04W 28/0284* (2013.01); *H04W 28/0846* (2020.05)

(58) Field of Classification Search
CPC ............. H04W 24/10; H04W 28/0284; H04W 28/0846; H04W 48/18
See application file for complete search history.

(56) References Cited

U.S. PATENT DOCUMENTS

2013/0144973 A1* 6/2013 Li ................... H04L 67/1004
709/217
2021/0297896 A1* 9/2021 Landais ................. H04L 47/33
(Continued)

FOREIGN PATENT DOCUMENTS

KR 2019/0088878 A 7/2019
WO WO 2019/101340 A1 5/2019
WO WO 2021/262261 A1 12/2021

OTHER PUBLICATIONS

Shetty, et al., "Intelligent Strategies for Overload Detection & Handling for 5G Network", IEEE 4th 5G Forum (5GWF), pp. 1-6 (2021).

(Continued)

*Primary Examiner* — Brian P Cox
(74) *Attorney, Agent, or Firm* — Jenkins, Taylor & Hunt, P.A.

(57) ABSTRACT

Methods, systems, and computer readable media for reporting a reserved load to a network function in a communications network are disclosed. One method includes determining, by a NF service producer, a current compute load metric value for the NF service producer operating in a communications network and detecting a number of active sessions supported at the NF service producer. The method further includes deriving a reserved compute load metric value corresponding to a predicted number of subsequent service requests at the NF service producer based on the number of active sessions and a predictive reserved load percentage value and calculating an adjusted reported compute load metric value amounting to a sum of the current compute load metric value and the reserved compute load metric value.

20 Claims, 4 Drawing Sheets

(51) Int. Cl.
   *H04W 28/02*   (2009.01)
   *H04W 28/08*   (2023.01)

(56) References Cited

U.S. PATENT DOCUMENTS

2022/0103443 A1    3/2022   Mary et al.
2022/0132358 A1*   4/2022   Peng ............... H04W 28/0268

OTHER PUBLICATIONS

Notification of Transmittal of the International Search Report and the Written Opinion of the International Searching Authority, or the Declaration for International Patent Application Serial No. PCT/US2023/021882 (Aug. 21, 2023).

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

"5G; 5G System; Network function repository services; Stage 3 (3GPP TS 29.510 version 16.8.0 Release 16)," ETSI TS 129 510, V16.8.0, pp. 1-234 (Aug. 2021).

"5G; 5G System; Technical Realization of Service Based Architecture; Stage 3 (3GPP TS 29.500 version 16.7.0 Release 16)," ETSI TS 129 500, V16.7.0, pp. 1-98 (Apr. 2021).

* cited by examiner

METHODS, SYSTEMS, AND COMPUTER READABLE MEDIA FOR REPORTING A RESERVED LOAD TO NETWORK FUNCTIONS IN A COMMUNICATIONS NETWORK

TECHNICAL FIELD

The subject matter described herein relates to reserved load handling methods for avoiding overload conditions and request rejections at network function (NF) service producers in fifth generation (5G) communications networks. More particularly, the subject matter described herein relates to methods, systems, and computer readable media for reporting a reserved load to a network function in a communications network.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints. Producer NFs register with a network function repository function (NRF). The NRF maintains an NF profile of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a Third Generation Partnership Project (3GPP) network function that provides a means to securely expose the services and capabilities provided by producer network functions servicing the network.

At present, 3GPP allows the use of a load metric indicator to specify a current compute load level of an NF instance. For example, the current compute load of the NF instance can be reported via a load control information (LCI) header as a percentage in the range of 0 to 100%, where 0 means no compute load (or 0% load) exists at the reporting NF instance and 100% indicates that a maximum load exists at the reporting NF instance (i.e., 100% load has been reached by the NF instance and/or no further load is desirable). In many scenarios, both the actual computation and usage of the load metric indicator by the NF instance are implementation specific. In many instances, the reported load parameter reported by NF service producers can be used (along with other parameters) for NF service selection decisions and/or load balancing inquiries made by an NF service consumer. For example, if a compute load level at an NF service producer is reported as a 'low level' at a given time, a NF service consumer is likely to select that NF service producer for resource creation (e.g., SMF selecting PCF for session creation) based primarily on the NF service producer's current load level information. After being selected by an NF service consumer, the NF service producer is also typically configured to receive subsequent messages related to the already accepted sessions and/or contexts. In some instances, the previously selected NF service producer may become overwhelmed upon receiving and processing these aforementioned subsequent messages, thereby causing unwanted delays to the service provided to its subscribed NF service consumers. In light of these subsequent messages, reporting only a current load level is usually insufficient for a NF service consumer to safeguard itself against future possibilities of overload at a serving NF producer.

Accordingly, there exists a need for improved methods and systems for reporting a reserved load to a network function in a communications network.

SUMMARY

Methods, systems, and computer readable media for reporting a reserved load to a network function in a communications network are disclosed. One method includes determining, by a NF service producer, a current compute load metric value for the NF service producer operating in a communications network and detecting a number of active sessions supported at the NF service producer. The method further includes deriving a reserved compute load metric value corresponding to a predicted number of subsequent service requests at the NF service producer based on the number of active sessions and a predictive reserved load percentage value and calculating an adjusted reported compute load metric value amounting to a sum of the current compute load metric value and the reserved compute load metric value.

According to another aspect of the method described herein, the reserved compute load metric is adjusted by a weightage modifier to produce a weighted reserved compute load metric value.

According to another aspect of the method described herein, generating one or more report messages including the adjusted reported computer load metric value.

According to another aspect of the method described herein, sending the one or more report messages to a respective one or more consumer service network functions.

According to another aspect of the method described herein, wherein each of the one or more report messages includes a load control information (LCI) header containing the adjusted reported computer load metric value.

According to another aspect of the method described herein, sending the one or more report messages to a respective one or more network function repository functions (NRFs).

According to another aspect of the method described herein, each of the one or more report messages includes an NfProfile section that contains the adjusted reported computer load metric value.

According to another aspect of the disclosed subject matter described herein, one system for reporting a reserved load to a network function in a communications network comprises a NF service producer that is supported by at least one processor and a memory and a load management engine that is implemented by the at least one processor configured for determining a current compute load metric value for the NF service producer operating in a communications network and detecting a number of active sessions supported at the NF service producer. The load management engine is also configured for deriving a reserved compute load metric value corresponding to a predicted number of subsequent service requests at the NF service producer based on the number of active sessions and a predictive reserved load percentage value and calculating an adjusted reported compute load metric value amounting to a sum of the current compute load metric value and the reserved compute load metric value.

According to another aspect of the system described herein, the reserved compute load metric is adjusted by a weightage modifier to produce a weighted reserved compute load metric value.

According to another aspect of the system described herein, the load management engine is configured to generate one or more report messages including the adjusted reported computer load metric value.

According to another aspect of the system described herein, the load management engine is configured to send the one or more report messages to a respective one or more consumer service network functions.

According to another aspect of the system described herein, each of the one or more report messages includes a load control information header containing the adjusted reported computer load metric value.

According to another aspect of the system described herein, the load management engine is configured to send the one or more report messages to a respective one or more network function repository functions.

According to another aspect of the system described herein, each of the one or more report messages includes an NfProfile section that contains the adjusted reported computer load metric value.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using one or more computer readable media having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for reporting a reserved load to a network function in a communications network. In some embodiments, the disclosed subject matter affords a mechanism that permits an NF service producer to report a reserved compute load metric value along with a current compute load metric value. Notably, a subscriber NF service consumer can utilize the reserved compute load metric value to better assess the likelihood that the associated NF service producer can service the NF service consumer without experiencing excessive compute loads and/or processing. Reference will now be made in detail to various embodiments of the subject matter described herein, examples of which are illustrated in the accompanying drawings. Wherever possible, the same reference numbers will be used throughout the drawings to refer to the same or like parts.

Figure 1:
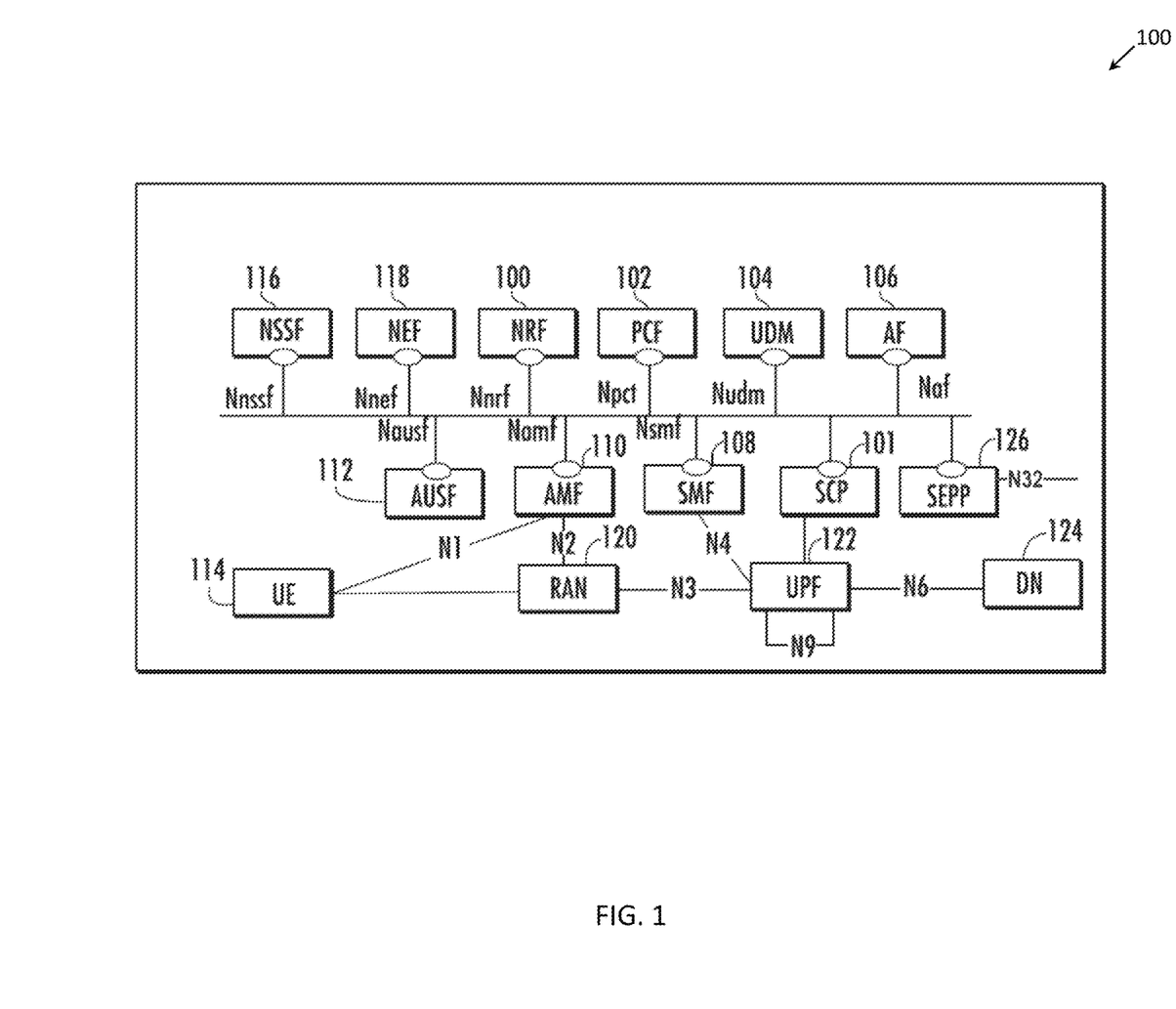
FIG. 1 is a network diagram illustrating an example fifth generation (5G) network architecture according to an embodiment of the subject matter described herein.

FIG. 1 is a block diagram illustrating an example 5G system network architecture, e.g., a home 5G core (5GC) network. The architecture in FIG. 1 includes an NRF 100 and a service communication proxy (SCP) 101, which may be located in the same home public land mobile network (PLMN). As described above, NRF 100 may maintain profiles of available producer NF service instances and their supported services and allow consumer NFs or SCPs to subscribe to and be notified of the registration of new/updated NF service instances. SCP 101 may also support service discovery and selection of NF instances. SCP 101 may perform load balancing of connections between consumer and producer NFs. In addition, using the methodologies described herein, SCP 101 may perform preferred NF location based selection and routing.

NRF 100 is a repository for NF or service profiles of NF instances. In order to communicate with a NF instance, a consumer NF or an SCP must obtain the NF service profile or the NF instance from NRF 100. The NF or service profile is a JavaScript object notation (JSON) data structure defined in 3GPP Technical Specification (TS) 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. In some embodiments, the SEPP is an gateway device positioned on the edge of a network.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

Figure 2:
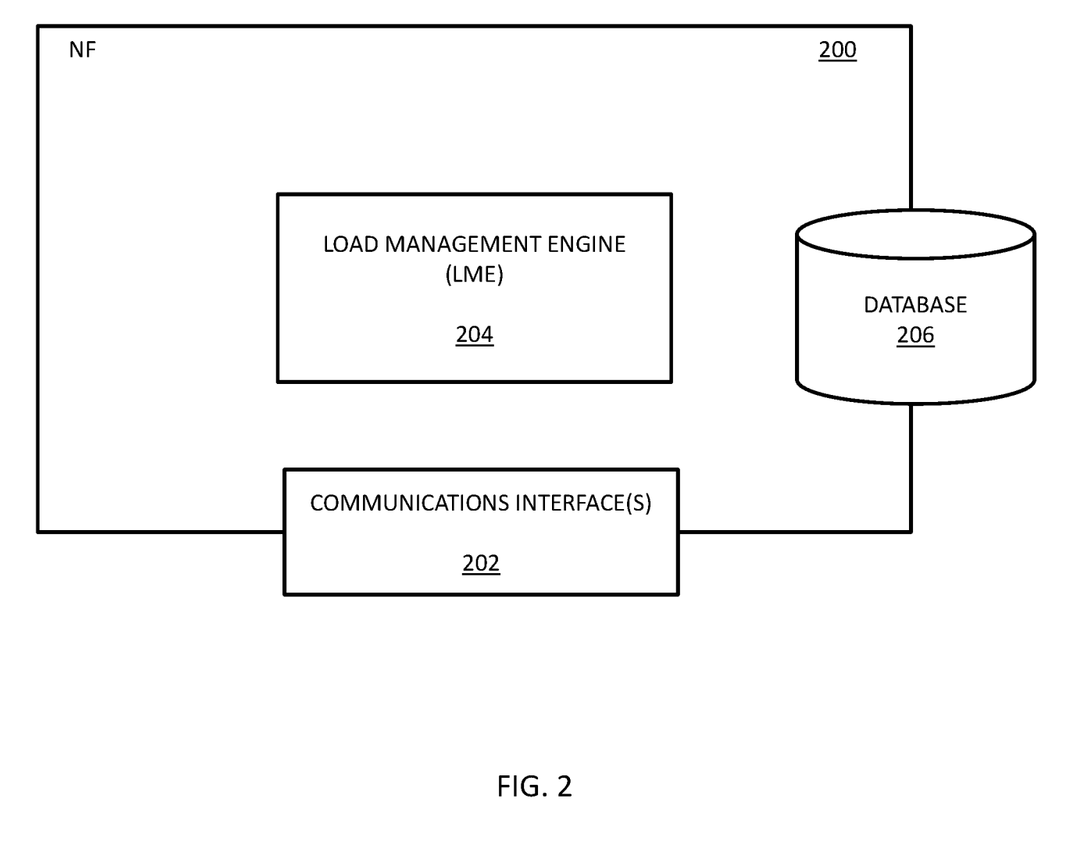
FIG. 2 is a signaling diagram illustrating an exemplary network system that is configured to report a reserved load to a network function in a communications network according to an embodiment of the subject matter described herein.

FIG. 2 is a block diagram illustrating an example NF 200 configured for reporting a reserved load to network functions in a communications network according to an embodiment of the subject matter described herein. NF 200 may represent any suitable entity or entities (e.g., one or more node(s), device(s), or computing platform(s)) for performing various aspects or functionalities described herein, e.g., determining and reporting a reserved capacity load to other network functions in a communication network. In some embodiments, NF 200 may include one or more 3GPP defined functions and/or related functionality. For example, NF 200 may include a NF service producer or the like.

Referring to FIG. 2, NF 200 may include one or more communications interface(s) 202 for communicating messages via a communications environment, e.g., one or more communications networks. For example, communications interface(s) 202 may include one or more communications interfaces for communicating with various entities in a home network (e.g., home public land mobile network (H-PLMN)), a visited network (e.g., a visited public land mobile network (V-PLMN)), and/or with other network functions operating in a 5G communications network.

In some embodiments, NF 200 may include a load management engine (LME) 204. Load management engine 204 may be any suitable entity (e.g., software executing on at least one processor) for performing various operations associated with determining and reporting capacity loads to other network functions. For example, load management engine 204 may be configured for i) determining a current compute load metric value for the NF service producer operating in a communications network, ii) detecting a number of active sessions supported at the NF service producer, iii) deriving a reserved compute load metric value corresponding to a predicted number of subsequent service requests at the NF service producer based on the number of active sessions and a predictive reserved load percentage value, and iv) calculating an adjusted reported compute load metric value amounting to a sum of the current compute load metric value and the reserved compute load metric value. The manner in which the load management engine performs these functions is described in greater detail below (e.g., see description of FIGS. 3 and 4).

In some embodiments, load management engine 204 may include implementation logic that is configured to determine the current compute load level (e.g., which may be represented as a current compute load metric value) of NF 200, which may be a NF service producer. Notably, the load management engine 204 is able to account for different parameters to calculate the NF's current compute load level. For example, the load management engine 204 can be configured to calculate the compute load level by considering various resources, such as CPU utilization, memory usage, disk utilization, and the like. Further, the load management engine 204 can determine how these parameters are being utilized at the time of reporting. Based on these assessments, the load management engine 204 can determine a current compute load metric value by assessing the percentage (A %) by which the underlying compute resources are used to process the current traffic rate.

In addition, the load management engine is also further configured to determine the number of active sessions currently being supported by NF 200, e.g., an NF service producer. Notably, the number of active sessions supported by the NF service producer can be used to calculate a reserved capacity load (e.g., a reserved compute load metric value) of the NF service producer.

In some embodiments, the load management engine 204 is adapted to determine the reserved load capacity of the NF service producer. For example, the load management engine may determine a predefined percentage (R %) of the active sessions (and/or contexts and/or resources) that represent a predicted reserved capacity load of the NF service producer. In some embodiments, this percentage is termed the reserved compute load metric value. For example, if the NF service producer (i.e., NF 200) is supporting 50,000 active sessions and a predefined operator parameter indicates that subsequent request messages amounts to 10% (i.e., a predictive reserved load percentage value) of the active sessions currently supported, the load management engine 204 may be configured to calculate a reserved compute load metric value that represents a rate (e.g., sessions per second or sessions per minute) in which subsequent messages associated with the active sessions are to be received over a predefined period (e.g., over 24 hours). In some embodiments, a 10% parameter value is defined and based on the traffic mix typically experienced in the operator network. In such a scenario, the reserved computed load metric value would equal a rate of 5000 sessions per second (i.e., 10% of 50,000 active sessions).

In some embodiments the load management engine 204 is also configured to determine a weightage modifier parameter (W %) associated with the reserved capacity load. Notably, the weightage modifier is used to set an appropriate weight to the reserve capacity load (i.e., reserved compute load metric value).

After each of the current compute load metric value, reserved compute load metric value, and weightage modifier parameter is determined by the load management engine 204, the adjusted reported compute load metric value can be determined. In some embodiments, the adjusted reported compute load metric value can be determined using the lower value of either [A %+(R %*W %)] or 100%. In particular, the load management engine 204 can determine an adjusted reported compute load metric value that is represented by the operation:

$$\min(A\%+(R\%*W\%), `100\%`)$$

For example, if the sum of the actual load percentage and the weighted reserved load is less than 100%, then the load management engine 204 will report the calculated value as the reported load (i.e., adjusted reported compute load metric value). If the calculated value is greater than 100%, the load management engine will instead report 100% as the adjusted reported compute load metric value.

In FIG. 2, NF 200 and/or load management engine 204 may access (e.g., read from and/or write information to) data storage 206. Data storage 206 may be any suitable entity (e.g., a computer readable medium or memory) for storing predetermined weightage modifiers, compute load determination logic, and/or any other predefined network operator values.

It will be appreciated that FIG. 2 and its related description are for illustrative purposes and that NF 200 may include additional and/or different modules, components, or functionality.

Figure 3:
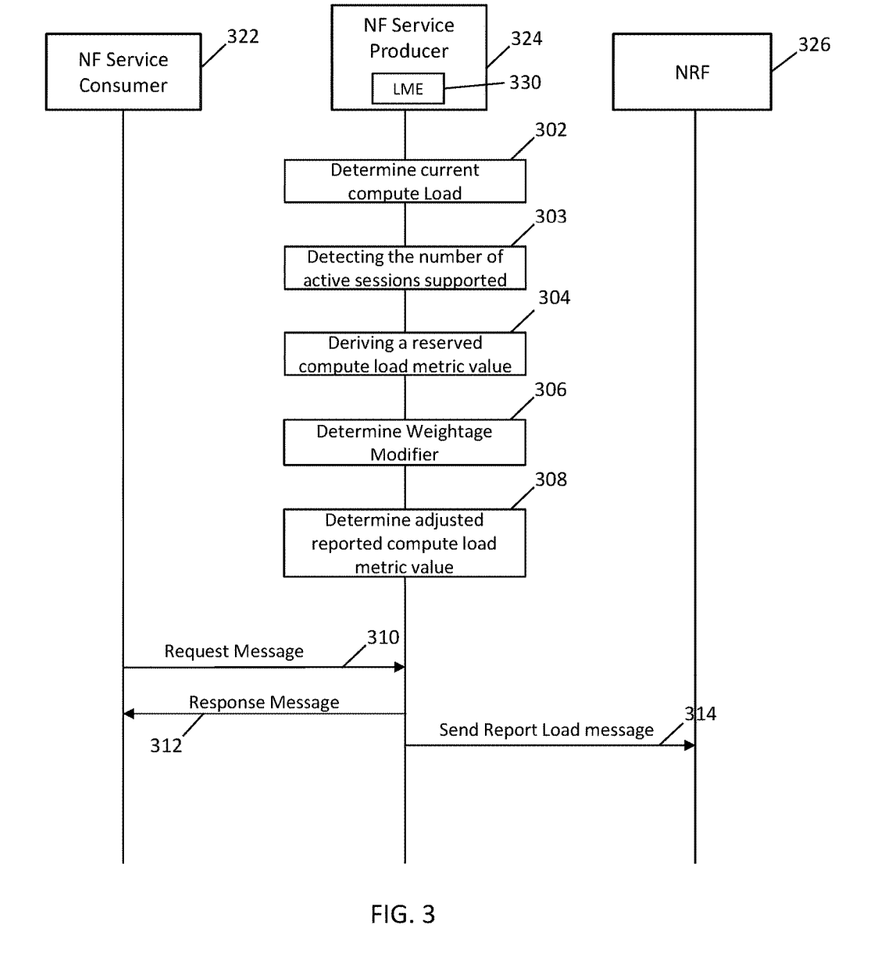
FIG. 3 is a block diagram illustrating a network function configured for reporting a reserved load to a network function in a communications network according to an embodiment of the subject matter described herein.

FIG. 3 illustrates an exemplary process for determining an adjusted reported load level. In particular, FIG. 3 depicts an NF service consumer 322, a NF service producer 324, and a NRF 326 operating in a communications network. Notably, NF service producer 324 includes a load management engine (LME) 330, which may be configured to execute one or more of the operations described herein.

In block 302, NF service producer 324 and/or load management engine 330 is configured to determine a current compute load metric value that is representative of the compute load being experienced at NF service producer 324. In some embodiments, the current compute load metric value can be represented as an active load parameter (A %), which may denote a percentage representation of the current compute load that is being experienced at NF service producer 324. For example, the load management engine 330 may determine that the current ingress traffic rate being processed by the NF service producer is 20,000 session requests per second (i.e., 20K/sec) and represents a 40% of the maximum compute load processing capabilities of NF service producer 324. Notably, this numerical rate represents the total ingress message load received by the NF service producer, i.e., represents the initial create session/resource request messages and subsequent session/resource request messages (associated with the initial create request messages). In some embodiments, the current ingress traffic rate is determined via a predefined moving average (e.g., rate determined over the last 24 hour period). Accordingly, the load management engine 330 may designate the 40% determined value as the current load parameter 'A %' (i.e., a parameter representing current compute load metric value).

As indicated above, the current load level (i.e., current compute load metric value) of an NF service provider instance can be assessed using implementation logic provisioned and/or included in load management engine 330. Thus, the load management engine 330 may be configured to consider different operating metrics and parameters to reflect the current compute load level of NF service producer 324. In some instances, load management engine 330 may calculate a current compute load level by assessing various use levels of the NF's underlying resources (such as CPU, memory, network bandwidth and processing latency, disk utilization, etc.) that are being utilized by the NF service producer 324 at reporting time.

In block 303, NF service producer 324 and/or load management engine 330 is configured to determine or detect the number of active sessions currently being supported by the NF service producer 324. In some embodiments, load management engine 330 can utilize the aforementioned implementation logic to ascertain the number of active sessions supported at the NF service producer. For example, load management engine 330 can determine NF service producer 324 is presently supporting 50,000 active sessions, which may include the sum of create session request messaging and/or create resource request messaging that are accepted by the NF service producer and are not yet terminated (e.g., SM associations accepted by PCF from SMF for Npcf_SMPolicyControl_Create Service Operation).

In block 304, NF service producer 324 and/or load management engine 330 is configured to derive a reserved compute load metric value (e.g., a reserved load parameter). Notably, this reserved compute load metric value may represent the predicted active sessions, context, and/or resources (i.e., the predictive message traffic for existing sessions) that are related to the active sessions and that are subsequently received by the NF service producer 324. In some embodiments, load management engine 330 may be configured to derive this value by applying a predefined reserved load parameter (R %) (or predictive reserved load percentage value) to the active session load. For example, load management engine 330 may determine that, based on operator network/traffic mix data, there is a 10% chance of receiving subsequent (or follow-up) service requests for the currently accepted active sessions supported by the NF service producer (i.e., the current 50,000 active sessions). The predetermined 10% reserved load parameter (R %) is applied by the load management engine to the 50,000 active sessions, which then results in a determination of a predictive traffic rate of 5000 sessions per second. In some embodiments, the 5K sessions/second is referred to as the 'reserved capacity' or 'predictive capacity'. If 40% of the maximum compute load processing capabilities of the NF service producer is consumed when handling an ingress 20K sessions per second, then in order to handle a 'reserved capacity' of 5K sessions, an additional capacity of 10% is required (i.e., (40%/20K)*5K=10%). Here, the 10% parameter is referred to as the 'reserved capacity load' or "predictive load' (i.e., reserved load parameter, R %)

In block 306, NF service producer 324 and/or load management engine 330 is configured to determine a weightage modifier parameter (W %) of the reserved load. In some embodiments, the weightage modifier parameter is a parameter value that is predefined by a network administrator. The weightage modifier parameter may represent a mechanism by which the operator can assign different weightings (or importance) to the reserved compute load metric value. Notably, an operator can designate or set the weightage modifier parameter to be equal to any value ranging from 0% to 100%. For example, if the load management engine has been configured to assign a 50% weightage modifier to the reserved compute load metric value amounting to 10%, then the resulting weighted reserved compute load metric value will be 5% (i.e., 50%*10%). In some embodiments, the calculation and/or utilization of the weightage modifier parameter is an optional functionality and/or feature.

In block 308, NF service producer 324 and/or load management engine 330 is configured to determine the adjusted reported compute load metric value. In some embodiments, load management engine 330 can utilize the current load (e.g., current compute load metric value), reserved load (e.g., reserved compute load metric value), and/or weighted percentage values (e.g., weightage modifier) as input parameters for calculating the adjusted reported compute load metric value. For example, load management engine 330 may utilize a min(A %+R %*W %, '100') formula indicated above to determine the adjusted reported compute load metric value. Notably, the adjusted reported compute load metric value may be determined to be equal to the lesser of 40%+10%*50% (as previously calculated in step 306), which amounts to 40%+5%=45%. Notably, 45% is less than 100%, so the load management engine 330 would be configured to utilize 45% in this example. If no weightage modifier was applied (i.e., no reserved compute load metric value is to be used), then the adjusted reported compute load metric value would be 40% (i.e., 40%+0%). If the entire weightage modifier is to be applied (i.e., all of the reserved compute load metric value should be used/considered), then the adjusted reported compute load metric value would be 50% (i.e., 40%+10%).

After determining the adjusted reported compute load metric value, NF service producer 324 may subsequently receive a service request message 310 from NF service consumer 322. Notably, service request message 310 can be any message from a NF service consumer that requests an NF service from the receiving NF service producer 324.

In response to receiving service request message 310 from NF service consumer 322, NF service producer 324 and/or load management engine 330 may be configured to proactively report the current and predicted load capacity information (i.e., adjusted reported compute load metric value) to the requesting NF service consumer (in addition to available NF service information). For example, NF service producer 324 and/or load management engine 330 may be configured to send, to NF service consumer 322, a service response message 312 that includes the adjusted reported compute load metric value as a load metric parameter (e.g., via LCI header).

Although not entirely within the scope of the disclosed subject matter, NF service consumer 322 can utilize the adjusted reported compute load metric value to assess whether the sending NF service producer 324 is an appropriate service provider and/or for any other manner. For example, NF service consumer 322 can utilize the adjusted reported compute load metric value to perform load balancing management actions in the communications network as well as to conduct NF service producer selections.

In some embodiments, NF service producer 324 and/or load management engine 330 is configured to report the adjusted reported compute load metric value to other NF instances, such as NRFs and NF service consumers without being triggered by a NF service request message. For example, NF service producer 324 and/or load management engine 330 may be configured to a send a report load message 314 to NRF 326 (e.g., load information included in NfProfile) without any prompting and/or trigger.

Figure 4:
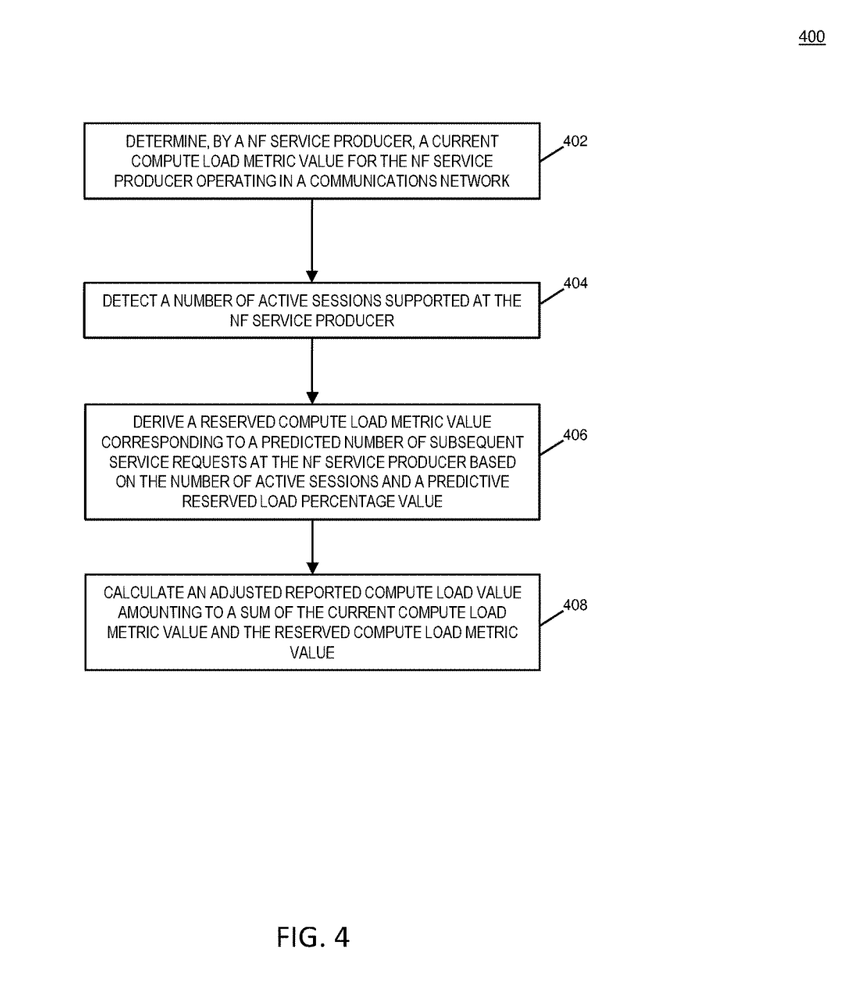
FIG. 4 is a flow diagram illustrating an exemplary method for reporting a reserved load to a network function in a communications network according to an embodiment of the subject matter described herein.

FIG. 4 illustrates a flow diagram illustrating a method 400 for reporting a reserved load to network functions in a communications network. In some embodiments, example method 400 described herein, or portions (e.g., operations or steps) thereof, may be performed at or performed by a network function, and/or a module or engine (e.g., load management engine) supported by the network function.

In step 402, a current compute load metric value is determined for the NF service producer operating in a communications network. In some embodiments, a load management engine is configured to utilize implementation logic to determine the current compute load level of the at the NF service producer. Notably, the NF service producer is able to account for different parameters to calculate the compute load level at the NF service producer. For example, the load management engine can be configured to calculate the compute load level by considering various resources, such as CPU utilization, memory usage, disk utilization, and the like. Further, the load management engine can determine how these parameters are being utilized at the time of reporting. Based on these assessments, the load management engine can determine a current compute load metric value.

In step 404, a number of active sessions supported at the NF service producer is detected. In some embodiments, the load management engine can include implementation logic to ascertain the number of active sessions supported at the NF service producer. For example, the load management engine can determine NF service producer is presently supporting 50,000 active sessions, which may include the sum of create session requests, create resource requests, and any subsequent session related messaging.

In step 406, a reserved compute load metric value corresponding to a predicted number of subsequent service requests at the NF service producer based on the number of active sessions and a predictive reserved load percentage value is derived. In some embodiments, the load management engine can be configured to determine, based on the operator network's traffic mix, that the NF service producer will receive approximately 10% subsequent service request message per second with respect to the currently active session supported over a predefined period (e.g., the next 24 hours). For example, if 50,000 active sessions were determined to be currently supported (e.g., in step 404), then a reserved rate representative of the predictive subsequent traffic for the existing sessions would be equal to 5000 sessions per second (i.e., 10% of 50,000 active session). In some embodiments, this value is referred to as the reserved compute load metric value, which may be based on the predicted number of subsequent service requests at the NF service producer based on the number of active session and a predictive reserved load percentage value.

In step 408, calculating an adjusted reported compute load metric value amounting to a sum of the current compute load metric value and the reserved compute load metric value. In some embodiments, the load management engine can utilize the determined current compute load metric value, reserved compute load metric value, and/or (optional) weightage modifier as input parameters for calculating the adjusted reported compute load metric value. For example, load management engine 330 may utilize a min(A %+R %*W %, '100') formula indicated above to determine the adjusted reported compute load metric value.

In some embodiments, each NF service produce can be configured to calculate the adjusted reported compute load metric value (or reserved capacity) in a unique manner (i.e., each reserved load can be calculated differently for each NF service instance). Some example configurations include 'PercentageReqForActiveSession', which entails the load management engine determining a predictive number of requests for active sessions currently accepted by the NF service producer instance. Notably, this will process will provide a reserved capacity to compute the reserved load. Further, a network operator can derive this value from its traffic mix or other analytical data available through internal or external source. To disable the feature, operator can set it to 0 (e.g., via the load management engine). A second configuration for calculating the reserved capacity includes the 'WeightageReservedCapacity' configuration, which represents the weighted value of reserved compute load with respect to the actual compute load. To disable this weightage modifier feature, operator can set it to 0.

Likewise, the load management engine can be configured to publish the reserved capacity toward an NRF or LCI using the 'IncludeReservedCapacityToLoad' configuration. When set to 'true', the reported load (i.e., adjusted reported compute load metric value) includes reserved load (at NRF and LCI). However, when this configuration is set to 'false', the actual reported compute load (at NRF or LCI) is the real compute load, whereas current compute load metric value (actual load) along with the reserved compute load metric value (reserved capacity) is published in a custom header along with LCI (i.e., using construct and structure of LCI, but as a custom header, e.g., along with 3gpp-Sbi-Lci (to publish load value). The load management engine can also publish the custom header "vendor-reserved-Lci" (for actual compute load and reserved capacity).

For simplification, a network operator may choose one of the following options when configuring the load management engine to calculate the reserved compute load metric of the NF service producer. First, the load management engine may have 'WeightedReservedLoad' set to 100% while 'PercentageReqForActiveSession' is adjusted to obtain the adjusted reserved load (i.e., adjusted reported compute load value). Alternatively, the load management engine may have 'PercentageReqForActiveSession' set to 100% while 'WeightedReservedLoad' is adjusted to obtain the adjusted reserved load. Further, the load management engine may have each of 'PercentageReqForActiveSession' and 'WeightedReservedLoad' appropriately set to obtain the adjusted reserved load (as described above).

It should be noted that the NF instance(s), load management engine, and/or functionality described herein may constitute or be facilitated by a special purpose computing device. Further, the load management engine and/or functionality described herein can improve the technological field of network function communications by providing a mechanism by which NF service consumers can more reliably select an NF service producer based on the combination of a current compute load and a predicted compute load. Accordingly, the load balancing among NF service producers and corresponding network communications will be more efficiently utilized.

Further, there are other several benefits for utilizing the reserved load information as described above. For example, the probability that the NF service producer reaches an overload condition is significantly reduced. As suggested by 3GPP standards, an NF service consumer can select an NF service producer with lower compute load value. By considering the predicted/expected traffic flow for existing sessions in the calculation of the reported load, the NF service producer will avoid experiencing overload conditions on a frequent basis.

Similarly, the disclosed subject matter can lower traffic rejections and increase performance. Since the NF service producer accounts for potential messages for already accepted sessions, the load management engine can help reserve bandwidth and processing capability. Thus, use of the disclosed subject matter will lead to lower the number of message rejections (e.g., caused by overload conditions) and hence result in improved throughput and performance.

The disclosure of each of the following references is incorporated herein by reference in its entirety.

REFERENCES

1. $3^{rd}$ Generation Partnership Project; Technical Specification 5G; 5G System; Technical Realization of Service Based Architecture; Stage 3 (Release 16) 3GPP TS 29.500 V16.7.0 (2021-04)
2. $3^{rd}$ Generation Partnership Project; Technical Specification 5G; 5G System; Network function repository services; Stage 3 (Release 16) 3GPP TS 29.510 V16.8.0 (2021-08)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for reporting a reserved load to a network function (NF) in a communications network, the method comprising:
   determining, by a NF service producer, a current compute load metric value for the NF service producer operating in a communications network;
   detecting, by the NF service producer, a number of active sessions currently being handled by the NF service producer;
   deriving, by the NF service producer, a reserved compute load metric value by multiplying the number of active sessions currently being handled by the NF service producer by a predictive reserved load percentage value to produce an estimate of subsequent service message traffic on the active sessions currently being handled by the NF service producer and computing the reserved compute load metric value as a percentage by which the estimate of predicted subsequent message traffic is expected increase the current compute load metric value of the NF service producer; and
   calculating, by the NF service producer, an adjusted reported compute load metric value amounting to a sum of the current compute load metric value and the reserved compute load metric value.

2. The method of claim 1 wherein the reserved compute load metric is adjusted by a weightage modifier to produce a weighted reserved compute load metric value.

3. The method of claim 1 comprising generating one or more report messages including the adjusted reported computer load metric value.

4. The method of claim 3 comprising sending the one or more report messages to a respective one or more consumer service network functions.

5. The method of claim 4 wherein each of the one or more report messages includes a load control information (LCI) header containing the adjusted reported computer load metric value.

6. The method of claim 3 comprising sending the one or more report messages to a respective one or more network function repository functions (NRFs).

7. The method of claim 6 wherein each of the one or more report messages includes an NfProfile section that contains the adjusted reported compute load metric value.

8. A system for reporting a reserved load to a network function (NF) in a communications network, the system comprising:
   a NF service producer that is supported by at least one processor and a memory; and a load management engine that is implemented by the at least one processor configured for determining a current compute load metric value for the NF service producer operating in a communications network, detecting a number of active sessions currently being handled by the NF service producer, deriving a reserved compute load metric by multiplying the number of active sessions currently being handled by the NF service producer by a predictive reserved load percentage value to produce an estimate of subsequent service message traffic on the active sessions currently being handled by the NF service producer and computing the reserved compute load metric value as a percentage by which the estimate of predicted subsequent message traffic is expected increase the current compute load metric value of the NF service producer, and calculating an adjusted reported compute load metric value amounting to a sum of the current compute load metric value and the reserved compute load metric value.

9. The system of claim 8 wherein the reserved compute load metric is adjusted by a weightage modifier to produce a weighted reserved compute load metric value.

10. The system of claim 8 wherein the load management engine is configured to generate one or more report messages including the adjusted reported compute load metric value.

11. The system of claim 10 wherein the load management engine is configured to send the one or more report messages to a respective one or more consumer service network functions.

12. The system of claim 11 wherein each of the one or more report messages includes a load control information (LCI) header containing the adjusted reported computer load metric value.

13. The system of claim 10 wherein the load management engine is configured to send the one or more report messages to a respective one or more network function repository functions (NRFs).

14. The system of claim 13 wherein each of the one or more report messages includes an NfProfile section that contains the adjusted reported computer load metric value.

15. One or more non-transitory computer readable media having stored thereon executable instructions that when executed by at least one processor of a computer cause the computer to perform steps comprising:
  determining, by a network function (NF) service producer, a current compute load metric value for the NF service producer operating in a communications network;
  detecting, by the NF service producer a number of active sessions currently being handled by the NF service producer;
  deriving, by the NF service producer, a reserved compute load metric value by multiplying the number of active sessions by a predictive reserved load percentage value to produce an estimate of subsequent service message traffic on the active sessions currently being handled by the NE service producer and computing the reserved compute load metric value as a percentage by which the estimate of predicted subsequent message traffic is expected increase the current compute load metric value of the NF service producer; and
  calculating, by the NF service producer, an adjusted reported compute load metric value amounting to a sum of the current compute load metric value and the reserved compute load metric value.

16. The one or more non-transitory computer readable media of claim 15 wherein the reserved compute load metric is adjusted by a weightage modifier to produce a weighted reserved compute load metric value.

17. The one or more non-transitory computer readable media of claim 15 comprising generating one or more report messages including the adjusted reported compute load metric value.

18. The one or more non-transitory computer readable media of claim 17 comprising sending the one or more report messages to a respective one or more consumer service network functions.

19. The one or more non-transitory computer readable media of claim 18 wherein each of the one or more report messages includes a load control information (LCI) header containing the adjusted reported computer load metric value.

20. The one or more non-transitory computer readable media of claim 17 comprising sending the one or more report messages to a respective one or more network function repository functions (NRFs).

* * * * *